Figure 1:
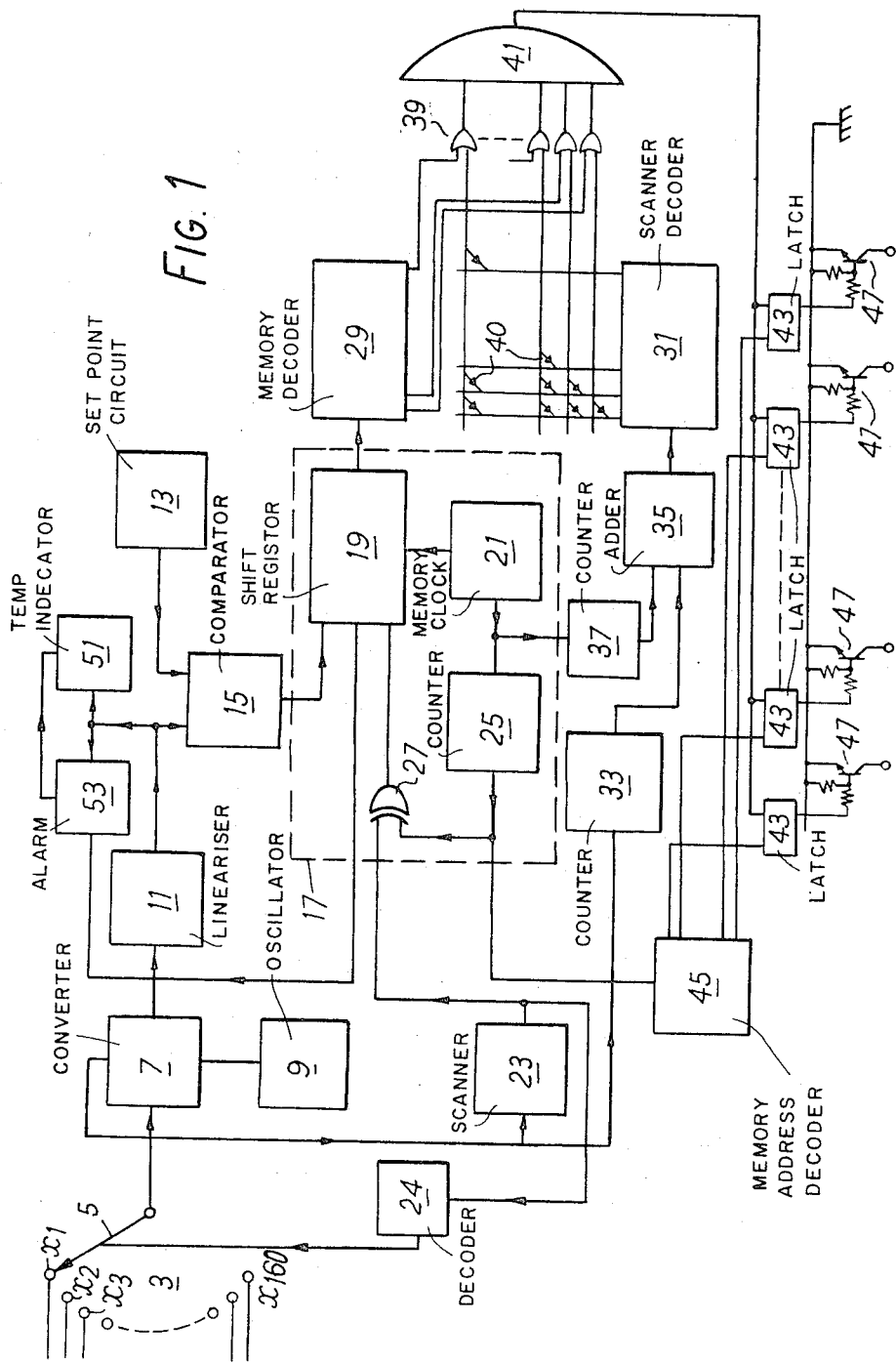

United States Patent [19]
Baxter et al.

[11] 3,798,624
[45] Mar. 19, 1974

[54] TEXTILE YARN TREATMENT MACHINES

[75] Inventors: Malcolm John Baxter; Terrence Graham Shillito, both of Manchester, England

[73] Assignee: Fielden Electronics Limited, Manchester, England

[22] Filed: Oct. 13, 1972

[21] Appl. No.: 297,326

[30] Foreign Application Priority Data
Oct. 16, 1971   Great Britain.................. 48242/71

[52] U.S. Cl..... 340/213 R, 340/147 CN, 235/151.1
[51] Int. Cl.... G06f 13/06, G06f 15/06, G06f 15/46
[58] Field of Search............ 340/213 R, 213 Q, 163; 235/151

[56] References Cited
UNITED STATES PATENTS
| | | | |
|---|---|---|---|
| 3,541,513 | 11/1970 | Paterson | 340/151 |
| 3,350,687 | 10/1967 | Gabrielson et al. | 340/151 X |
| 3,519,807 | 7/1970 | Jaques et al. | 235/151.1 |

Primary Examiner—Donald J. Yusko
Attorney, Agent, or Firm—Browdy and Neimark

[57] ABSTRACT

Apparatus for controlling a variable at each of a plurality of locations comprises stations at which are presented analogue values of the variable, scanning means for scanning the stations in sequence, an analogue digital converter which converts the output of the scanning means to an output signal representing in sequence and in digital form the analogue values of the scanning means output, comparator means comparing each digital equivalent with a desired value thereby to provide a sequence of difference signals, a recirculating memory which recirculates very much faster than the scanning speed of the scanning means, means for loading the memory in sequence with the difference signals at the scanning rate of the scanning means, a mark-space ratio generator for generating mark space ratios for the difference signals and means for presenting a mark-space ratio selected by the memory at each of the said locations.

12 Claims, 6 Drawing Figures

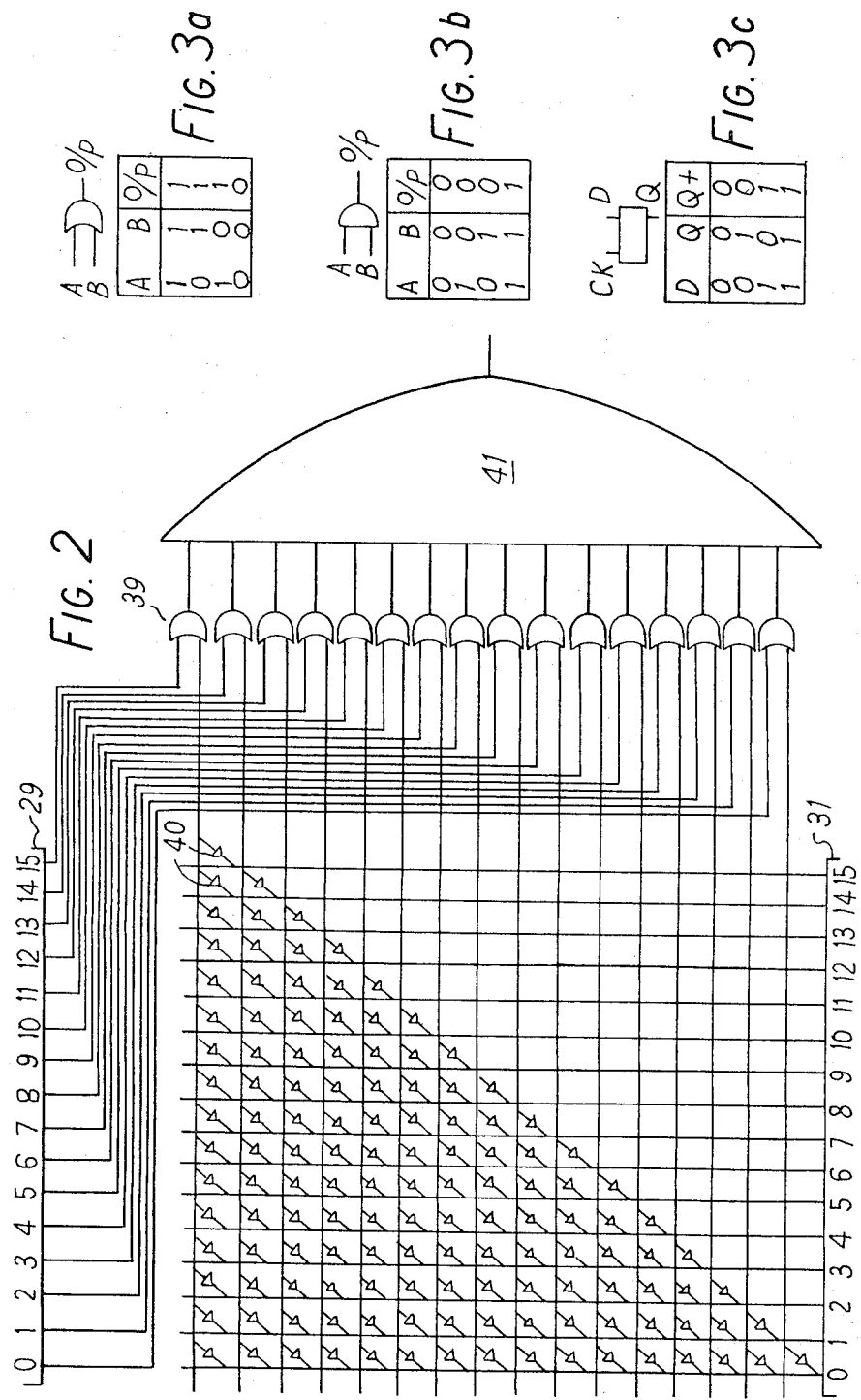

TEXTILE YARN TREATMENT MACHINES

This invention relates to apparatus for controlling a variable at each of a plurality of locations. In industrial machines and processes it is often required to control a variable at a large number of locations. For example in a textile yarn heat treatment machine the temperature at a large number of points in the machine has to be closely controlled and to this end a heater is provided at each point, the electrical power to the heater being regulated to maintain the temperature at the point between desired limits. One way in which overall control of the heaters of such a machine may be effected is to present at each point to be controlled a number of mark space ratios and to gate the requisite ratio into the heater at the point thereby to control in a given period the amount of energy fed to the heater. This system has the disadvantage that at each controlled point it is necessary to provide logic gates equal in number to the number of mark space ratios as well as a memory and decoder which determine the progressive selection of the gates to be operated so as to supply the correct mark space ratio to the relevant heater. Control apparatus is thus multiplied by the number of points being controlled and this approach to the problem is most expensive because of the amount of equipment involved. It is an object of the present invention to provide apparatus for controlling a variable at each of a plurality of locations which requires relatively little equipment and accordingly affords an economic solution to the problem.

The present invention consists in apparatus for controlling a variable at each of a plurality of locations, comprising stations at which are in operation presented respective electrical analogue values of the variable at the locations, scanning means for scanning the stations in sequence thereby to provide an output signal representing said analogue values serially, an analogue to digital converter to which the output signal of the scanning means is supplied and which affords an output signal representing in sequence and in digital form the analogue values of the scanning means output signal, comparator means for comparing each digital equivalent of an analogue value with a desired value thereby to provide a sequence of difference signals, a recirculating memory the recirculation rate of which is many times greater than the rate at which the scanning means scan from one to the next station, means for loading the memory in sequence with the difference signals from the comparator at the or substantially the rate at which the scanning means scan from one to the next station, a mark-space ratio generator for generating mark space ratios for the difference signals and means for presenting a mark-space ratio selected by the memory at each of the said locations.

Preferably, the comparator is adapted to present the difference signals in respective categories of a predetermined number of categories and the mark-space generator is adapted to provide a separate mark-space ratio for each category.

It will be appreciated that in the apparatus of the invention the memory is selecting at high speed and in series mark-space ratios required at the different locations where control is being effected so that these ratios are supplied from the central control to the individual locations and need for elaborate control equipment such as memories and decoders at each location is avoided.

Advantageously, the mark-space generator comprises a first decoder having a plurality of outputs, a repeating counter adapted, at the same speed as the scanner, to supply to the decoder repeatedly a sequence of numbers there being one number in each sequence for each output of the decoder and the numbers in the sequence calling up successively the decoder outputs which correspond in number with categories of the comparator, and, a plurality of logic gates corresponding in number with the decoder outputs and each having an input connected in relation to the decoder outputs so that a first of the decoder outputs connects with an input of each logic gate whilst successive outputs of the decoder after the first connect successively with one fewer inputs of the logic gates, whereby during the period of a complete sequence of outputs of the decoder the logic level at the input to any particular one of the gates remains at one logic level for a proportion of the period depending on the number of decoder outputs to which it is connected and at another logic level for the balance of the period.

Suitably, the outputs of the logic gates connect with inputs of further logic gate means and there is provided a memory decoder having outputs corresponding with the number of outputs of the first decoder and connected respectively with inputs of the logic gates other than those connected with the first decoder outputs, the memory decoder being supplied at the stepping speed of the memory successively with the difference signals in the memory, each difference signal addressing one only of the memory decoder outputs according to the category of the difference signal and the further logic gate means serving to provide outputs of duration corresponding with the stepping of the memory each output being a section of logic level corresponding with that available at one of the logic gates at the input thereof connected to an output or outputs of the first decoder.

In one form of the invention simultaneous switching of power from and to large numbers of power consuming devices is prevented and to this end at the input to the first decoder is provided an adder unit which is supplied with the output of the repeating counter and with the output of a second repeating counter comprising pulses at the stepping speed of the memory which pulses are converted in the second repeating counter to a repeated sequence of successive numbers having one number per output of the first decoder whereby the output of the adder unit supplied to the first decoder consists of a repeated sequence of numbers being the number output of the first repeating counter to which is added at memory speed each number of the sequence counted by the second repeating counter whereby each mark-space ratio of the first decoder is divided into a number of phases corresponding with the number of the first decoder outputs.

Figure 4:
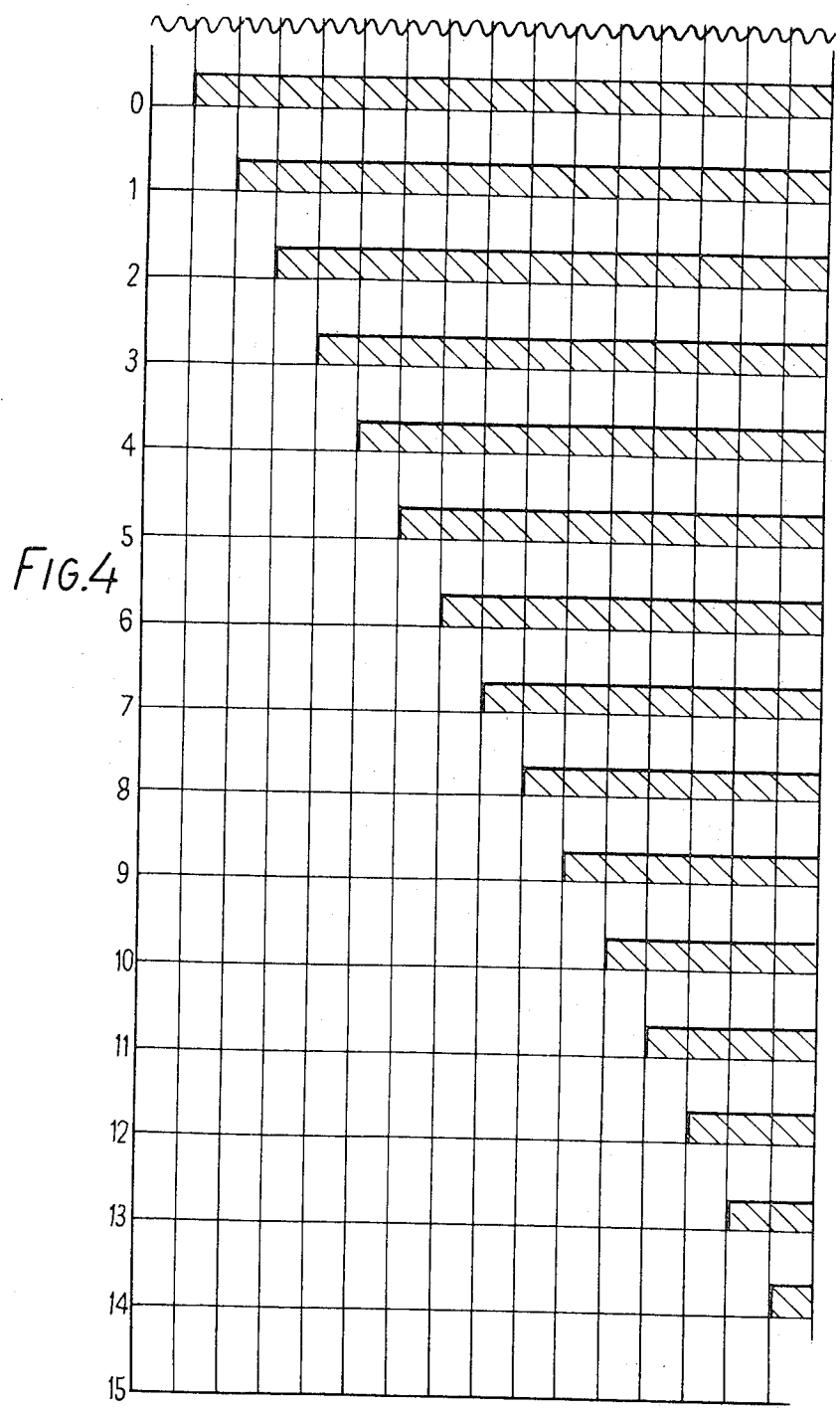

The invention will now be described, by way, of example, with reference to the accompanying, diagrammatic drawings, in which:

FIG. 1 is a block schematic representation of apparatus, in accordance with the invention, for controlling a variable at each of a plurality of locations, in this instance the variable being temperature and the locations being situated in a textile yarn heat treatment machine, FIG. 2 illustrates in greater detail part of the apparatus of FIG. 1, FIGS. 3a to c are truth tables showing the behaviour of components of the apparatus of the preceding Figures, and FIG. 4, illustrates mark-space ratios produced by a mark space generator forming part of the apparatus of FIGS. 1 and 2.

Referring the the drawings, in which, throughout, like parts have been accorded the same reference indicia, apparatus for controlling yarn temperature in a textile yarn heat treatment machine comprises a scanner 3 in which a scanning element 5 traverses a number, in this instance 160 stations $x_1$ to $x_{160}$, dwelling at each of said stations for two cycles of the mains supply, i.e., for 40 milliseconds in the case of a 50 Hz A.C. mains supply. At each of the stations $x_1$ to $x_{160}$ is available a voltage being an analogue equivalent value of the temperature measured by a thermocouple of a particular point in the textile yarn heat treatment machine connected to the station.

The temperature analogue voltages at the stations of the scanner 3 are accordingly supplied in sequence to an analogue to digital converter 7 have a source of pulses in the form of an oscillator 9 the frequency of which is in the neighbourhood of 1 M.Hz.

To reject the effects of periodic noise at the supply frequency the analogue to digital converter, which is of known form operating on the dual-slope ramp principle, integrates the input signal thereto from the scanner over a precise cycle period of the supply and this requires the oscillator frequency to be a precise multiple of the supply frequency. This is achieved by feedback adjustment of the oscillator frequency.

During the mains cycle following an integration the integral in the converter is returned to zero at a fixed reference rate in a time depending on the value of the integral and during this time pulses from the oscillator provide the digital equivalent of the integrated input. Accordingly the output from the converter 7 is a series of digital signals, which conveniently are produced in the converter in known manner in binary form and are representative of the analogue voltages at the stations $x_1$ to $x_{160}$.

Because the voltage output of a thermocouple is non-linear with respect to the temperature being measured the binary signals from the converter 7 are supplied to a lineariser 11 where in known manner a binary number is added to or subtracted from each binary input to correct the latter so that the binary output from the lineariser increments equally per incremental change of temperature at any point in the machine.

The linearised binary output from the lineariser is fed to a comparator 15 where it is compared with the binary representation of a desired temperature value referred to hereinafter as the "set point" value which is supplied from circuit 13. In the comparator the comparison is effected by adding the value of the lower number input to the complement of the larger input. Thus if the set point exceeds the input from the lineariser, the latter is added to the complement of the former and vice versa. If the comparator 15 is set for the wrong number, i.e., to receive the complement of a number rather than the number itself, the circuit becomes overloaded and thereby caused to reset itself to receive the correct values of the two inputs thereto. The operating state of the comparator accordingly indicates the polarity of the difference between an input from the lineariser and the set point value and forms the first digit of a four bit word output from the comparator. The other three bits of the four bit word indicate an error naught to seven times a chosen error. With the polarity bit, the four bits define sixteen error conditions of which two ± 0 are the same. Accordingly the comparator output expresses the difference between a particular temperature and a desired value in any of fifteen categories, a zero category, seven positive and seven negative categories.

The comparator output is supplied to a memory 17 including a high speed circulating shift register 19 which circulates 160 four bit word inputs from the comparator, the four bit word being clocked along the shift register by a memory clock 21 in the form of an oscillator which provides clock pulses at high frequency e.g. 100 Khz. At this clocking frequency the four bit words are advanced in the shift register every 10 microseconds, whilst, as hereinafter described, the shift register is updated by the insertion of four-bit words from the comparator every 40 milliseconds (in the case of a 50 cycle supply), i.e., at the rate the scanner traverses the stations $x_1$ to $x_{160}$. Thus at the typical values given the shift register steps at 4,000 times the rate at which four bit words from the comparator 15 are fed thereto.

The clocking of four bit words into the memory from the comparator is effected by bringing into correspondence binary words from a scanner address unit 23 and from a repeating counter 25 connected to the memory clock 21. The scanner address unit 23 has supplied thereto a pulse from the scanner everytime the scanner moves from one to the next of stations $x_1$ to $x_{160}$ and provides a sequence of outputs of binary representations of numbers 1 to 160 which outputs step along at the scanner address speed, i.e., typically every 40 milliseconds.

The output of the scanner address unit is employed via a decoder 24 to drive the scanner 3 so that the dwell of the scanner is synchronised with the scanner address unit output.

The repeating counter 25 counts every 160 pulses from the clock 21 and provides a sequence of outputs also representing in binary form numbers 1 to 160. This sequence repeats at 4,000 times, for the typical values stated, the speed of the sequence of outputs from the scanner address.

The outputs from the unit 23 and repeating counter 25, are supplied to a series of exclusive — OR gates, shown here as single exclusive — OR gate 27 which when the inputs thereto are in correspondence provide an enabling pulse which enters into the shift register 19 of the memory the output at the comparator thus updating the memory with new data identifying the category of the error in relation to the set point of the temperature at a particular location in the machine. It may be observed here that whilst reference is made herein to a set point, the set point value need not be the same for all temperature points. Also for convenience it will be assumed that the machine is working at the typical values given, i.e., mains frequency 50 cycles per second, scanner speed 40 milliseconds at each scanned point and a memory clock frequency of 1M.Hz.

The output of the memory shift register is supplied to a memory decoder 29 which operates, as hereinafter explained, in conjunction with a scanner decoder 31 which serves as a mark-space generator and which is supplied with the output of a repeating counter 33 by way of an adder unit 35 which is also supplied from a repeating counter 37 connected to the memory clock 21. The decoders 29 and 31 each have sixteen outputs 0 – 15 one only of which responds to any one input by changing from logic level '1' to logic level '0.' Decoder 31, ignoring for the present the effect of adder unit 35, receives input signals from counter 33 in binary form representing numbers 0 to 15 in sequence and the counter 33 is supplied with a pulse from the converter 7 whenever the scanner advances. The outputs 0 to 15 of decoder 31 are accordingly reduced sequentially from logic level '1' to logic level '0' every 40 milliseconds. During the 40 milliseconds dwell at logic level '0' at one of the outputs of decoder 31, the memory decoder 29 experiences a sequence of 4,000 signals each of 10 microseconds at either one or more of its 16 outputs and this sequence, because of the clocking into the input of the memory during this period of one word only from the comparator, is updated with data which appears 1.6 milliseconds later at the memory output to decoder 29.

The outputs of the decoder 29 connect with respective inputs of OR-gates collectively indicated at 39. For ease of description these OR-gates are hereinafter individually identified with reference to the output of decoder 29 to which they are connected. Thus OR-gate O is connected to output 0 of decoder 29 and so forth.

OR-gate 15 is connected by respective diodes 40 with each of the sixteen outputs of decoder 31 so that when any output of decoder 31 is brought to logic level '0' the connected input of gate 15 is brought to logic level '0.' One input of OR-gate 14 is likewise connected to outputs 0 to 14 of decoder 31 by diodes so that its input so connected is brought to logic level '0' whenever any of the outputs 0 to 14 of decoder 31 is lowered to logic level 0.

The connection between OR-gate 13 and decoder 31 is likewise such that a signal at any of outputs 0 to 13 of decoder 31 brings the input connected therewith of the gate 13 to logic level '0'. As one progresses to OR-gate 0 the number of outputs to which connections via diodes 40 are made reduces, the number of outputs to which OR-gate 0 is connected being one.

The outputs of OR-gates 0 – 15 provide inputs of an AND-gate 41 the output of which is connected to provide parallel inputs to each of 160 D-type flip-flop latches. These latches are supplied serially with 10 microsecond clock pulses from a memory address decoder 45 the input of which is connected to the output of the repeating counter 25 which repeats a count in binary form of numbers 1 to 160. Thus the number inputs to the memory address decoder are converted to respective 10 microsecond clock pulses which are supplied in sequence repeatedly to the latches 43.

As mentioned earlier the decoder 31 acts as a mark-space generator and the manner in which this is brought about will now be described. The FIGS. 3a to c illustrate the behaviour of the OR-gates 0–15, the AND-gate 41 and the D-type flip-flop latches. It will be seen that in the case of an OR-gate logic level '1' appearing at any or all of its inputs results in logic level '1' appearing at its output. In the case of the AND-gate logic level '1' only appears at the output if all inputs are at that level. With the D-type latches the column Q+ shows what happens to the output Q when the next clock pulse is received. It will therefore be appreciated that whatever maybe the logic level at the D input to the latch that level is transferred to the output Q by the next clock pulse.

Looking now more particularly at FIGS. 2 and 4 and considering the situation where outputs 0 to 15 of decoder 31 are signalled in sequence by the inputs thereto from repeating counter 33 and are accordingly brought in sequence each to logic level '0' for a period of 40 milliseconds, it still being assumed that the adder unit 35 has no effect. The total period of this sequence is 32 cycles of the supply as shown in the upper part of FIG. 4, i.e., 0.64 seconds or one tenth of the total scan time of scanner 3. If the voltage of the input of gate 0 connected to output 0 of decoder 31 by a diode 40 is viewed for the full period of the 0.64 seconds sequence it will be seen that for the first 40 milliseconds the logic level is '0' and for the rest of the period it is at level '1.' Accordingly if at any time during the first 40 milliseconds the OR-gate 0 is addressed by a 10 microsecond signal at output 0 of decoder 29 the two inputs of OR-gate 0 are then at logic level '0' for the duration of the 10 microsecond signal so that the output of the gate 0 is brought to level '0.' The output of all other gates 1 – 15 are however high since although their inputs which are connected to output 0 of decoder 31 are at level '0' their other inputs are at level '1.' Thus the inputs to AND-gate 41 from OR-gate 0 is at level '0' and from OR gates 1–15 is at level '1.' This means that the output of AND-gate 41 is at level '0.' During any subsequent 40 millisecond period of the 0.64 second sequence, since the level of the OR-gate 0 input connected to output 0 of decoder 31 is at level "1", a 10 microsecond signal at the output 0 of decoder 29 will leave the output of OR-gate 0 at level '1' so that all inputs to and therefore the output from AND-gate 41 are at level 1. Accordingly during the 0.64 second period the logic level '1' being mark or '0' being space prevailing at the input of OR-gate 0 connected to output 0 of decoder 31 is reproduced at the output of AND-gate 41. Thus at anytime in the 0.64 second sequence that gate 0 is addressed by an ouput (i.e., a lowering of the logic level from '1' to '0') at point 0 of decoder 29, for 10 microseconds the mark or space condition of the input of OR-gate 0 prevailing at the input of that gate connected to output 0 of decoder 31 is supplied to all the latches 43 in parallel and the particular latch being at that time addressed by the memory address decoder 45 is updated until the next time it is clocked, i.e., 1.6 milliseconds later. The latch 43 being addressed at that time corresponds with the word output of the memory to decoder 29. Thus the memory output and the latch being addressed and therefore updated are at the same point in the memory sequence.

If one now looks at the voltage of OR-gate 1 during the 0.64 second sequence at the input to the gate connected via a diode 40 to output points 0 and 1 of the decoder 31, it is seen that during the first and second 40 millisecond periods of the sequence the voltage level is '0' and during the rest of the 0.64 seconds it is at level 1. If during the first 80 milliseconds, therefore, OR-gate 1 is addressed by a 10 microsecond signal from decoder 29 the output of AND-gate 41 is at level '0' but for the rest of the 0.64 second sequence the AND-gate output is at level 1 whenever gate 1 is addressed. In general therefore the mark space signal at the input of any one of the OR-gates connected to the decoder 31 via diodes 40 is reproduced for 10 microseconds at the output of AND-gate 41, and therefore at the 'D'-inputs of all latches 43 whenever that one of the OR-gates is addressed from the decoder 29. The signal from decoder 29 thus calls up from the decoder 31 that part of the mark-space ratio required every 10 microseconds at the latches and repeats this for any particular latch at 1.6 microsecond invervals. FIG. 4 thus shows the mark space ratios at OR-gate 0 to 15, or at the output of gate 41 for the whole 0.64 second sequence a 10 microsecond section of one of which is presented to the 'D'-inputs of latches 43 for each output of the decoder 29, i.e., each lowering from level '1' to level '0' of an output of decoder 29 by a four bit word at its input.

The outputs of the latches are connected to respective $n - p - n$ transistors 47 which commence to conduct when the latch output is at level '1.' Conduction of any of the transistors causes a DC voltage to be applied to the gate electrode of a triac (not shown) there being one triac per transistor 47. The firing of a particular triac turns on a heater at the relevant one of the 160 points of the textile machine and the triac remains in conduction for the balance of the prevailing half cycle of the mains supply.

Firing of the triacs is accordingly by the mark space ratio applied to the latches and any particular latch will remain in its condition for 40 milliseconds after which its condition may or may not change depending on whether the updating of the memory involves change.

The energy supplied to the heaters is accordingly programmed in dependence upon the content of the memory which is being updated by the same or fresh data relating to one of the 160 points in the machine whenever during the 40 millisecond scanner dwell at that point the scanner address output and the output of counter 25 correspond.

It is desirable in the context of embodiments of the invention where large numbers of electrical power consuming devices are employed such as the heaters of the present embodiment to avoid simultaneously starting of mark periods at all or large numbers of these devices which would involve interrupted heavy loads on the mains. It is the purpose of the adder unit to ensure that this cannot happen.

Accordingly the adder unit adds a binary number 0 to 15 to the binary number output from the repeating counter 33. The added number is derived from repeating counter 37 which repeatedly counts number 0 to 15 at the speed of memory clock 21, i.e., at 10 microsecond intervals. The binary number supplied to decoder 31 therefore except when counter 37 adds the value 0 is in advance of the binary number at the output of the counter 33. Thus during the 40 milliseconds that a particular binary number is available at the output of counter 33 it is having added to it at 10 microsecond intervals a number which in successive intervals goes from 0 to 15 and then repeats. Accordingly during a 40 millisecond period the outputs of decoder 31 are repeatedly sequenced, the stepping from one to the next output being at 10 microsecond intervals whereas without the adder unit the dwell at each output was 40 milliseconds. It will be seen therefore that for any particular number at the output of counter 33 and which remains there for 40 milliseconds, instead of getting out of the decoder 31 a 40 millisecond slice of one mark space ratio, there is obtained serially 10 microsecond slices of all the phases of a mark space ratio or looked at another way 10 microsecond slices of one mark space ratio which every 10 microseconds is phase advanced effectively by 40 6.4 seconds. Accordingly in any period of 40 milliseconds the phase advancing effect at 40 millisecond intervals of the mark-space ratio generated staggers the onset of mark periods into 16 groups evenly over the 6.4 second period so that the required load demand is more evenly distributed over that period.

The apparatus is provided with temperature indicating and alarm devices. These devices 51 and 53 respectively are connected each to the output of the lineariser 11. The alarm circuit is somewhat similar to the comparator 15 and compares the measured temperature from the lineariser 11 with upper and lower alarm limits an alarm signal being obtained when the measured temperature goes outside the alarm limits. A connection to the indicator 51 from the alarm 53 provides that when there is an alarm signal the indicator is arrested to provide the temperature at the particular point in the 160 locations of the machine which is in the alarm condition. The alarm circuit in known manner by use of delay circuits is arranged not to respond to spurious signals such as transients and will only respond if the alarm is present for a predetermined number of cycles of the scanner 3. The alarm may be a visual or audible alarm.

The indicator 51 uses a gallium arsenide diode display and incorporates a repeating counter which can count from 0 to 160 at either a stepping speed equal to the speed of the scanner, i.e., 40 milliseconds per step or a stepping speed equal to the speed of each complete scan, i.e., 6.4 seconds per step. On the faster speed of the indicator counter, the indicator will stop at the first point in an alarm condition. Releasing the fast scan control and actuating it again causes the indicator to scan again at the higher speed to the next point in an alarm condition. At the slow speed thereof the indicator counter advances the indicated position once per complete scan of the scanner.

It will be appreciated that whilst the apparatus has been described in relation to temperature control it could of course be used to effect control of other variables at a number of spaced locations. Also the typical figures quoted can be changed in any manner appropriate to the context in which the invention is being applied.

We claim:

1. Apparatus for controlling a variable at each of a plurality of locations, comprising stations at which are presented respective electrical analogue values of the variable at the locations, scanning means for scanning the stations in sequence thereby to provide an output signal representing said analogue values in series, an analogue to digital converter to which the output signal of the scanning means is supplied and which affords an output signal representing in sequence and in digital form the analogue values of the scanning means output signal, comparator means for comparing each digital equivalent of an analogue value with a desired value thereby to provide a sequence of difference signals in respective categories of a predetermined number of categories, a recirculating memory the recirculation rate of which is many times greater than the rate at which the scanning means scan from one to the next station, means for loading the memory in sequence with the difference signals from the comparator at the or substantially the rate at which the scanning means scan from one to the next station, a mark-space ratio generator for generating mark space ratios for the respective categories of difference signals provided by the comparator means and means for presenting a mark-space ratio selected by the memory at each of said locations.

2. Apparatus as claimed in claim 1, wherein the mark-space generator comprises a first decoder having a plurality of outputs, a repeating counter adapted, at the same speed as the scanner, to supply to the decoder repeatedly a sequence of numbers there being one number in each sequence for each output of the decoder and the numbers in the sequence calling up successively the decoder outputs which correspond in number with the categories of the comparator, and, a plurality of logic gates corresponding in number with the decoder outputs and each having an input connected in relation to the decoder outputs so that a first of the decoder outputs connects with an input of each logic gate whilst successive outputs of the decoder after the first connect successively with one fewer inputs of the logic gates, whereby during the period of a complete sequence of outputs of the decoder the logic level at the input to any particular one of the gates remains at one logic level for a proportion of the period depending on the number of decoder outputs to which it is connected and at another logic level for the balance of the period.

3. Apparatus as claimed in claim 2, wherein the outputs of the logic gates connect with inputs of further logic gate means and there is provided a memory decoder having outputs corresponding with the number of outputs of the first decoder and connected respectively with inputs of the logic gates other than those connected with the first decoder outputs, the memory decoder being supplied at the stopping speed of the memory successively with the difference signals in the memory, each difference signal addressing one only of the memory decoder outputs according to the category of the difference signal and the further logic gate means serving to provide outputs of duration corresponding with the stepping of the memory each output being a section of the logic level corresponding with that available at one of the logic gates at the input thereof connected to an output or outputs of the first decoder.

4. Apparatus as claimed in claim 3, wherein at the input to the first decoder is provided an adder unit which is supplied with the output of a second repeating counter comprising the output of the repeating counter and with pulses at the stepping speed of the memory which pulses are converted in the second repeating counter to a repeated sequence of successive numbers having one number per output of the first decoder whereby the output of the adder unit supplied to the first decoder consists of a repeated sequence of numbers being the number output of the first repeating counter to which is added at memory speed each number of the sequence counted by the second repeating counter whereby each mark-space ratio of the first decoder is divided into a number of phases phases corresponding with the number of the first decoder outputs.

5. Apparatus as claimed in claim 3, wherein the output of the further logic gate is supplied in parallel to latches respectively associated with the locations where a variable is to be controlled thereby to operate the latches with mark-space ratios generated by the first decoder.

6. Apparatus as claimed in claim 5, wherein the latches are adapted each to control the supply of power to a device at one location for controlling the variable at that location.

7. Apparatus as claimed in claim 5, wherein the latches are sequentially operated at the speed of the memory.

8. Apparatus as claimed in claim 1, wherein the means for loading the memory comprise a repeating counter which provides a repeating count of successive numbers equal to the number of stations and at the speed of the scanner and a further repeating counter which provides at the speed of the memory a repeating count of successive numbers equal to the number of stations, the output of the repeating counter and further repeating counter being supplied to logic gate means which when the two counters correspond provide an output which operates the memory so as to admit thereto the difference signal at the output of the comparator.

9. Apparatus as claimed in claim 1, wherein indicator means are provided and connected to the analogue to digital converter and are adapted to operate at either of two speeds, a fast speed at which the values of the analogue of variable at the stations is successively indicated and a slow speed at which said analogue values are successively indicated after each complete scan of the scanner.

10. Apparatus as claimed in claim 9, wherein there is provided an alarm unit which compares each digital value from the converter with alarm limits and triggers an alarm when any digital value lies outside the alarm limits, the alarm unit being connected to the indicator means so that when the latter is operating at its fast speed, it will be arrested at the first alarm condition and when made to scan again at its fast speed it will be arrested at the next alarm condition.

11. Apparatus as claimed in claim 10, wherein the alarm unit is connected with the memory and thereby adapted not to be triggered until an alarm condition has circulated in the memory a predetermined number of times.

12. Apparatus as claimed in claim 1, wherein there is provided a lineariser for linearising the digital outputs of the analogue to digital converter with respect to the variable being controlled.

* * * * *